United States Patent
Yabe

(10) Patent No.: US 9,883,056 B2
(45) Date of Patent: Jan. 30, 2018

(54) IMAGE PROCESSING APPARATUS, IMAGE PROCESSING METHOD, AND IMAGE PROCESSING SYSTEM

(71) Applicant: Hirohisa Yabe, Kanagawa (JP)

(72) Inventor: Hirohisa Yabe, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/926,986

(22) Filed: Oct. 29, 2015

(65) Prior Publication Data
US 2016/0127583 A1 May 5, 2016

(30) Foreign Application Priority Data

Oct. 31, 2014 (JP) ................... 2014-223458
May 28, 2015 (JP) ................... 2015-108919

(51) Int. Cl.
*H04N 1/00* (2006.01)
*G06F 3/12* (2006.01)

(52) U.S. Cl.
CPC ....... *H04N 1/00344* (2013.01); *G06F 3/1205* (2013.01); *G06F 3/1255* (2013.01); *G06F 3/1273* (2013.01); *G06F 3/1285* (2013.01); *H04N 1/0009* (2013.01); *H04N 1/00087* (2013.01); *H04N 2201/0017* (2013.01); *H04N 2201/0075* (2013.01); *H04N 2201/0094* (2013.01)

(58) Field of Classification Search
CPC .................................. H04N 1/00344
USPC ................................ 358/1.15, 1.14
See application file for complete search history.

(56) References Cited

U.S. PATENT DOCUMENTS

2010/0309513 A1* 12/2010 Aizawa ............. G06F 3/1204
                                                       358/1.15
2012/0287446 A1* 11/2012 Matsumura ........ G06K 15/005
                                                       358/1.6
2012/0317253 A1* 12/2012 Maekawa ........... H04L 41/0816
                                                       709/221

FOREIGN PATENT DOCUMENTS

JP          2012-256301          12/2012

* cited by examiner

*Primary Examiner* — Jacky X Zheng
(74) *Attorney, Agent, or Firm* — Harness, Dickey & Pierce, P.L.C.

(57) ABSTRACT

An image processing apparatus includes a storage configured to store a setting of various functions of the image processing apparatus; a first receiver configured to receive operation information for changing the setting stored in the storage via a network; a changer configured to change the setting stored in the storage based on the operation information received by the first receiver; a second receiver configured to receive, through an input unit provided in the image processing apparatus, a display operation of displaying the setting stored in the storage; and a notifier configured to notify, when the second receiver receives the display operation after the setting is changed by the operation information, that the setting has been changed by the operation information.

8 Claims, 12 Drawing Sheets

| NOTIFICATION DESTINATION NAME | DETAIL OF NOTIFICATION DESTINATION | NECESSITY OF NOTIFICATION |
|---|---|---|
| SERVICE PERSON A | serviceA@abcd.co.jp | NECESSARY |
| SERVICE PERSON B | serviceB@abcd.co.jp | NOT NECESSARY |
| ⋮ | ⋮ | ⋮ |

| TIME AND DATE OF CHANGE | PERSON IN CHARGE OF CHANGE | CHANGE CONTENT | | |
|---|---|---|---|---|
| | | SETTING ITEM | BEFORE-CHANGE SETTING | AFTER-CHANGE SETTING |
| 05/23/2015 AT 11:56:43 | SUPPORT A | VOLUME SETTING | 50 | 150 |
| 05/25/2015 AT 12:12:23 | SUPPORT B | PRINT IMAGE QUALITY | HIGH QUALITY | STANDARD |
| ⋮ | ⋮ | ⋮ | ⋮ | ⋮ |

IMAGE PROCESSING APPARATUS, IMAGE PROCESSING METHOD, AND IMAGE PROCESSING SYSTEM

CROSS-REFERENCE TO RELATED APPLICATION

The present application claims priority to and incorporates by reference the entire contents of Japanese Patent Application No. 2014-223458 filed in Japan on Oct. 31, 2014 and Japanese Patent Application No. 2015-108919 filed in Japan on May 28, 2015.

BACKGROUND OF THE INVENTION

1. Field of the Invention

The present invention relates to an image processing apparatus, an image processing method, and an image processing system.

2. Description of the Related Art

In recent years, a high functionality of an information processing device has caused a complexity of a setting operation for each function. For a maximum utilization of such an information processing device, it is necessary for a user to be familiar with each of functions and setting operations provided in the information processing device. However, there is a case where a user who is not familiar with the information processing device causes an error by deleting a necessary setting and making an inappropriate setting.

To deal with this problem, a technique of remotely changing a setting content and remotely guiding the user through a remote operation to the user's information processing device has been known.

Therefore, there is a need for an image processing apparatus, an image processing method, and an image processing system capable of notifying that a setting is changed through a remote operation.

SUMMARY OF THE INVENTION

It is an object of the present invention to at least partially solve the problems in the conventional technology.

According to an embodiment, there is provided an image processing apparatus that includes a storage configured to store a setting of various functions of the image processing apparatus; a first receiver configured to receive operation information for changing the setting stored in the storage via a network; a changer configured to change the setting stored in the storage based on the operation information received by the first receiver; a second receiver configured to receive, through an input unit provided in the image processing apparatus, a display operation of displaying the setting stored in the storage; and a notifier configured to notify, when the second receiver receives the display operation after the setting is changed by the operation information, that the setting has been changed by the operation information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 illustrates an example of a notification destination table according to the embodiment;

FIG. 8 illustrates a change content table according to the embodiment;

DETAILED DESCRIPTION OF THE PREFERRED EMBODIMENTS

An exemplary embodiment of an apparatus, a method, a program, and a system for image processing will be explained in detail below with reference to the accompanying drawings. While a case of applying an image processing apparatus to a multifunction peripheral (hereinafter referred to as "MFP") is taken as an example in the explanation below, the present invention is not limited thereto. Here, a multifunction peripheral includes at least two functions among a copying function, a scanner function, a facsimile function, and a printing function.

Figure 1:
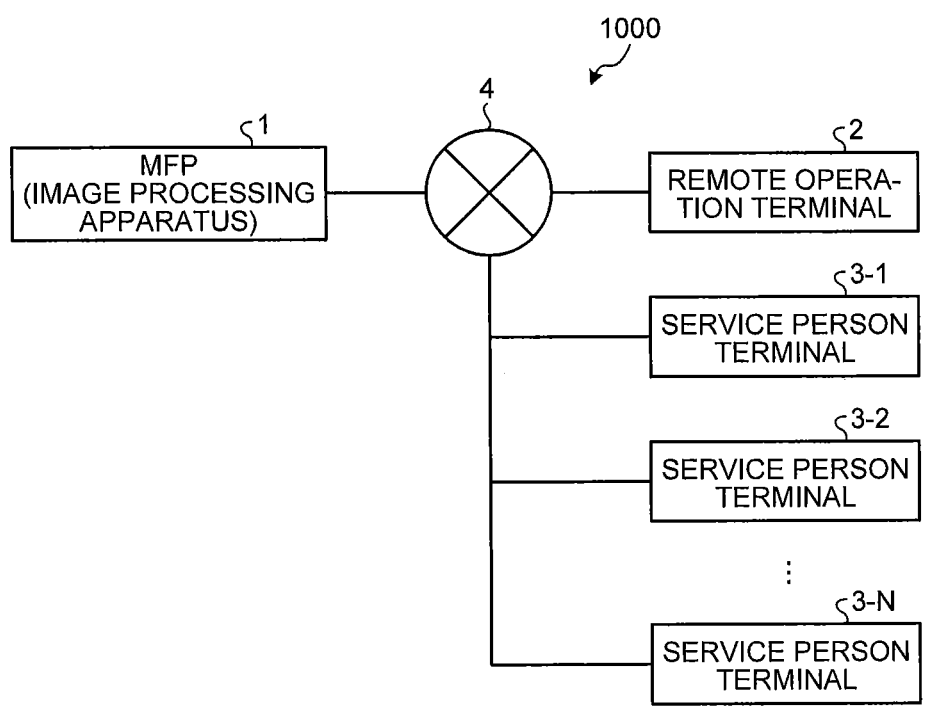
FIG. 1 illustrates an example of a configuration of an image processing system according to an embodiment.

FIG. 1 illustrates an example of a configuration of an image processing system 1000 according to an embodiment. The image processing system 1000 according to the embodiment is provided with an MFP 1, a remote operation terminal 2, and a service person terminal 3-1, a service person terminal 3-2, . . . , and a service person terminal 3-N ("N" is an integer equal to or more than one). Here, the service person terminal 3-1, the service person terminal 3-2, . . . , and the service person terminal 3-N are simply referred to as a service person terminal 3 unless there is a necessity of discrimination thereamong. Here, the image processing system 1000 may be provided with a plurality of MFPs 1 and remote operation terminals 2.

The MFP 1, the remote operation terminal 2, and the service person terminal 3 are connected to each other via a network 4 such as the Internet. Here, any one of wired and wireless communication systems may be adopted for the connection to the network 4. Alternatively, a combination of wired and wireless communication systems may be adopted for the connection to the network 4.

The MFP 1 is an image processing apparatus arranged at an office of a user. The remote operation terminal 2 is an information processing device such as a personal computer arranged at a service center and the like dealing with an inquiry and the like from the user. When receiving an inquiry from the user, an operator of the remote operation uses the remote operation terminal 2 to check a condition, a setting, and the like of the MFP 1, connected via the network 4, of the user and performs a remote operation of changing the setting as necessary. The operator of the remote operation thus deals with the inquiry and the like from the user.

The service person terminal 3 is a tablet terminal and the like carried by a service person who visits the user using the MFP 1 and provides maintenance of the MFP 1. Here, the service person terminal 3 is not limited to the tablet terminal. The service person terminal 3 may be a general personal computer and the like, for example.

Next, the MFP 1, the remote operation terminal 2, and the service person terminal 3 will be explained in detail.

An example of a hardware configuration of the MFP 1 will first be explained.

Figure 2:
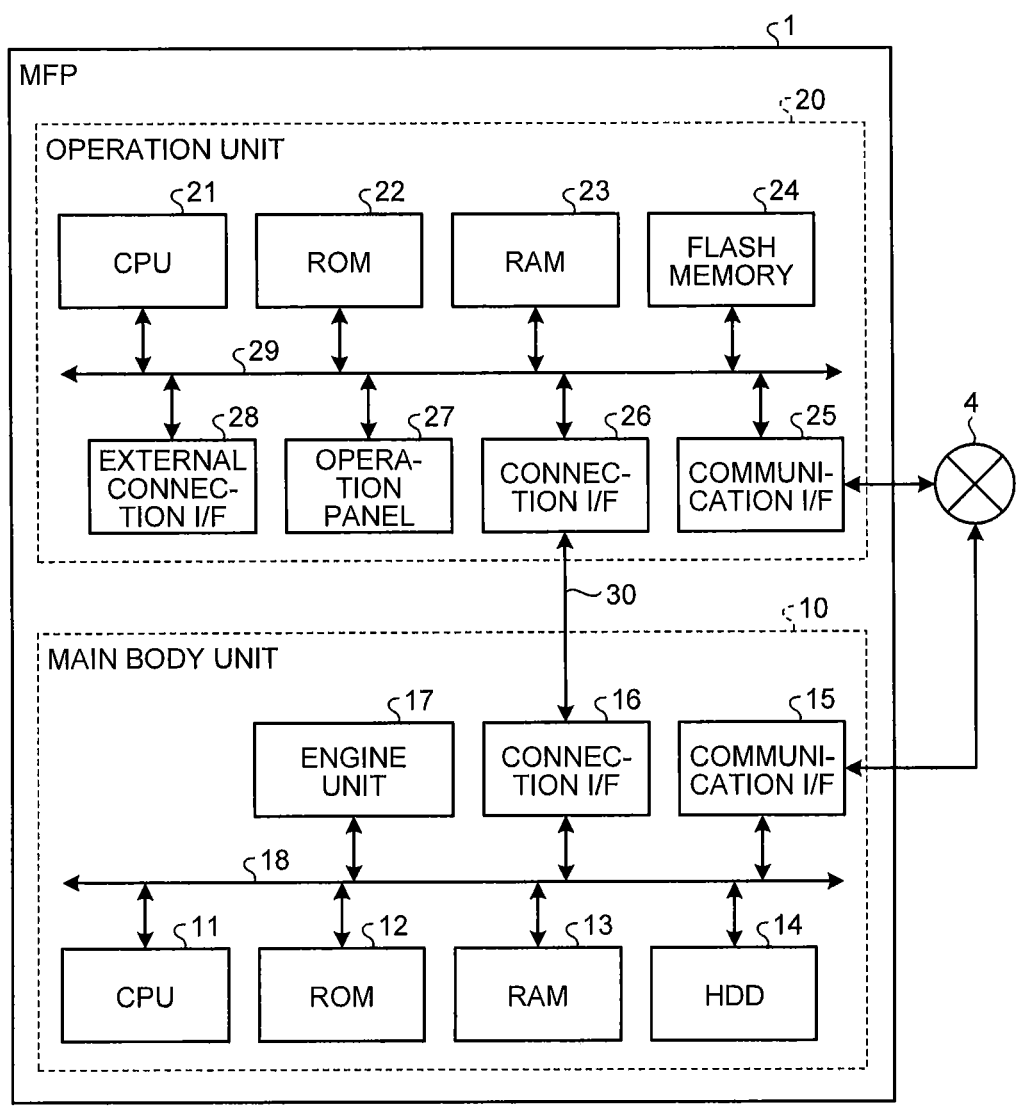
FIG. 2 illustrates an example of a hardware configuration of an MFP according to the embodiment.

FIG. 2 illustrates an example of a hardware configuration of the MFP 1 according to the embodiment. As illustrated in FIG. 2, the MFP 1 is provided with a main body unit 10 and an operation unit 20. The main body unit 10 realizes functions of various kinds including a copying function, a scanner function, a facsimile function, a printing function, and the like. The operation unit 20 receives information depending on an operation by the user. The information depending on the operation by the user is, for example, a signal indicating coordinate values of a screen and the like.

The main body unit 10 and the operation unit 20 are connected via a connection I/F 16, a dedicated communication channel 30, and a connection I/F 26 in such a manner that a communication thereamong is enabled. The communication channel 30 may use, for example, a USB (Universal Serial Bus) standard, irrespective of being wired or wireless. The communication channel 30 may adopt any other arbitrary standard, without applying only to the USB.

In the case where the communication channel 30 is wireless, a close range wireless communication unit such as an infrared communication unit, an RF (Radio Frequency) communication unit, and a Bluetooth® communication unit is provided in the main body unit 10 and the operation unit 20, for example. Alternatively, the main body unit 10 and the operation unit 20 are provided with a wireless LAN communication function such as the Wi-Fi® to enable a communication with each other via a wireless LAN (Local Area Network) access point 31 illustrated in FIG. 3 and the network 4.

The main body unit 10 performs an operation depending on an operation received by the operation unit 20. The main body unit 10 is capable of communicating with an external device such as a mobile terminal and a client PC (personal computer) not illustrated in FIG. 1 and performing an operation depending on an instruction (a print instruction and the like) received from the external device.

A hardware configuration of the main body unit 10 will be explained first. As illustrated in FIG. 2, the main body unit 10 is provided with a CPU (Central Processing Unit) 11, a ROM (Read Only Memory) 12, a RAM (Random Access Memory) 13, an HDD (Hard Disk Drive) 14, a communication I/F 15, the connection I/F 16, and an engine unit 17. The CPU 11, the ROM 12, the RAM 13, the HDD 14, the communication I/F 15, the connection I/F 16, and the engine unit 17 are connected to each other via a system bus 18.

The CPU 11 totally controls an operation of the main body unit 10. The CPU 11 uses the RAM 13 as a work area (work space) and executes programs stored in the ROM 12 or the HDD 14. With this configuration, the CPU 11 controls the entire operation of the main body unit 10 and realizes various functions including the copying function, the scanner function, the facsimile function, the printing function, and the like.

The communication I/F 15 is an interface that enables a connection to the network 4. The connection I/F 16 is an interface that enables a communication with the operation unit 20 via the communication channel 30.

The engine unit 17 is a hardware that performs a processing, except for a versatile information processing and communication, for realizing the copying function, the scanner function, the facsimile function, and the printing function. For example, the engine unit 17 is provided with a scanner that scans and reads out an image of paper material such as a script, a document, and a slip, a plotter that performs printing onto a sheet member such as paper, a facsimile unit that performs a facsimile communication, and the like. The engine unit 17 may further be provided with hardware that realizes special options such as a finisher that sorts printed sheet members and an ADF (Automatic Document Feeder) that automatically feeds a paper material.

Next, a hardware configuration of the operation unit 20 will be explained. As illustrated in FIG. 2, the operation unit 20 is provided with a CPU 21, a ROM 22, a RAM 23, a flash memory 24, a communication I/F 25, the connection I/F 26, an operation panel 27, and an external connection I/F 28. The CPU 21, the ROM 22 that stores programs and the like, the RAM 23 that functions as a work memory, the flash memory 24, the communication I/F 25, the connection I/F 26, the operation panel 27, and the external connection I/F 28 are connected to each other via a system bus 29. The flash memory 24 stores programs and information of various kinds which will be explained later.

The CPU 21 totally controls an operation of the operation unit 20. The CPU 21 uses the RAM 23 as a work area (work space) and executes programs stored in the ROM 22 or the flash memory 24. With this configuration, the CPU 21 controls the entire operation of the operation unit 20 and realizes a display and the like of information (image) in accordance with an input received from the user.

The communication I/F 25 is an interface that enables a connection to the network 4. The connection I/F 26 is an interface that enables a communication with the main body unit 10 via the communication channel 30.

The operation panel 27 is, for example, a liquid crystal display (LCD) device equipped with a touch-screen function of displaying information of various kinds. The operation panel 27 receives inputs of various kinds in accordance with operations by a user and displays information of various kinds (for example, information appropriate to the received operation, information indicating an operational status of the MFP 1, and information indicating a setting state).

The operation panel 27 is not limited to the liquid crystal display device. The operation panel 27 may be configured by an organic EL display device equipped with a touch-screen function, for example. Moreover, the operation panel 27 may further be provided with a hardware key (button), a lamp, and the like. Alternatively, the operation panel 27 may be provided with the hardware key (button), the lamp, and the like in place of the liquid crystal display (LCD) device equipped with the touch-screen function.

The external connection I/F 28 is an interface like an NFC (Near Field Communication) to be used for a connection to a mobile terminal.

Next, a software configuration of the MFP 1 will be explained.

Figure 3:
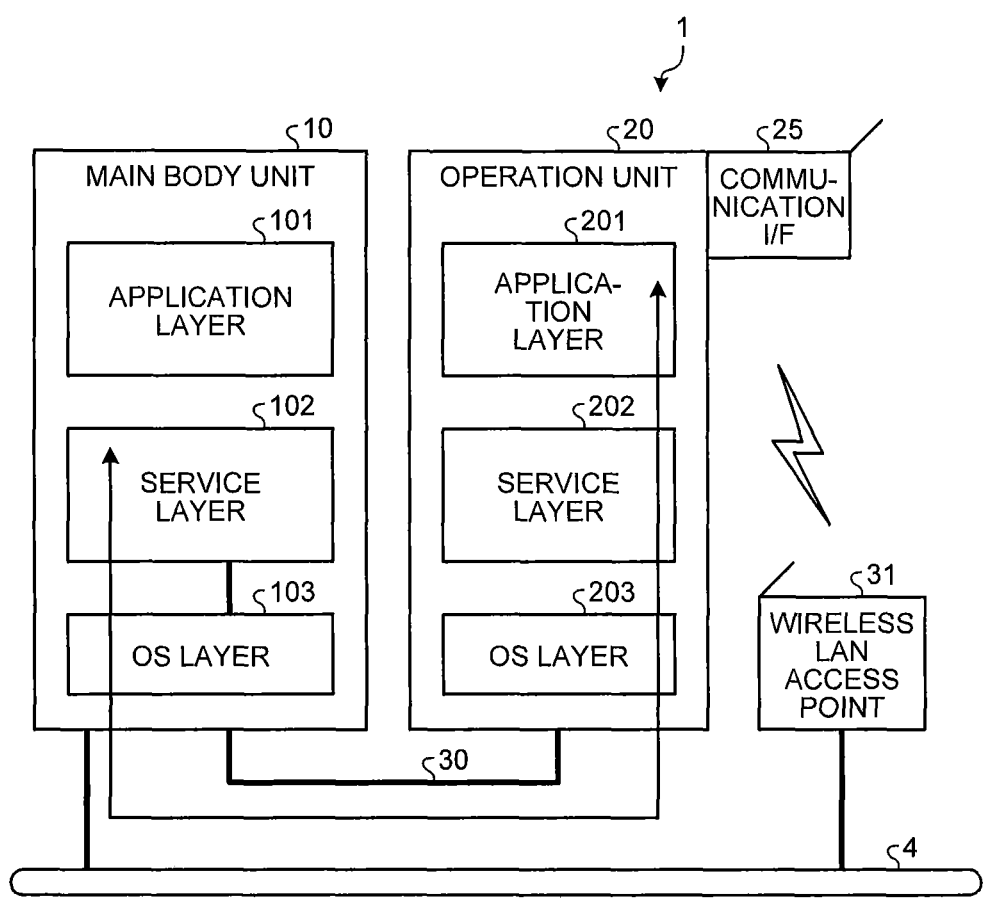
FIG. 3 illustrates an example of a software configuration of the MFP according to the embodiment.

FIG. 3 illustrates an example of a software configuration of the MFP 1 according to the embodiment. As illustrated in FIG. 3, the main body unit 10 is provided with an application layer 101, a service layer 102, and an OS layer 103. The substances of the application layer 101, the service layer 102, and the OS layer 103 are software of various kinds stored in the ROM 12, the HDD 14, and the like. The CPU 11 executes the software to provide functions of various kinds.

A software of the application layer 101 is an application software (hereinafter sometimes referred to simply as "application" in the explanation below) for providing a predetermined function by operating a hardware resource. For such applications, a copy application that provides a copying function, a scanner application that provides a scanner function, a facsimile application that provides a facsimile function, and a printer application that provides a printing function can be listed, for example.

A software of the service layer 102 intervenes between the application layer 101 and the OS layer 103 and provides, with respect to an application, an interface that enables using a hardware resource provided in the main body unit 10. More specifically, the software of the service layer 102 provides a function of receiving an operation request to the hardware resource and performing an arbitration of operation requests. The operation request received by the service layer 102 includes a request for scanning by a scanner and a request for printing by a plotter.

The interface function by the software of the service layer 102 is provided not only to the application layer 101 of the main body unit 10 but also to an application layer 201 of the operation unit 20. Specifically, the application layer 201 (application) of the operation unit 20 is also able to realize functions using the hardware resource (the engine unit 17 in FIG. 2, for example) of the main body unit 10 via the interface function of the service layer 102.

A software of the OS layer 103 is a basic software (operating system) for providing a basic function of controlling the hardware provided in the main body unit 10. The software of the service layer 102 converts a request for using the hardware resource from applications of various kinds into a command which can be interpreted by the OS layer 103 and passes the command to the OS layer 103. The software of the OS layer 103 executes the command, so that the hardware resource operates in accordance with the request of the application.

Similarly, the operation unit 20 is provided with the application layer 201, a service layer 202, and an OS layer 203. The hierarchical structure of the application layer 201, the service layer 202, and the OS layer 203 of the operation unit 20 is the same as that of the main body unit 10.

However, the functions provided by the applications of the application layer 201 and the kinds of the operation requests which can be received by the service layer 202 are different from those of the main body unit 10. An application of the application layer 201 is a software chiefly for providing a function as a user interface (UI) that allows an operation and a display with regard to functions (the copying function, the scanner function, the facsimile function, and the printing function) provided in the main body unit 10. The application of the application layer 201 may be software for providing a predetermined function by operating the hardware resource provided in the operation unit 20.

To maintain independence in function in the embodiment, the software of the OS layer 103 of the main body unit 10 is different from the software of the OS layer 203 of the operation unit 20. In other words, the main body unit 10 and the operation unit 20 independently operate with each other by separated operating systems. For example, the Linux® may be used for the software of the OS layer 103 of the main body unit 10 and the Android® may be used for the software of the OS layer 203 of the operation unit 20.

Since the main body unit 10 and the operation unit 20 operate by separated operating systems in the MFP 1 according to the embodiment as explained so far, the communication between the main body unit 10 and the operation unit 20 is performed not as an inter-process communication within a common device but as a communication between different devices. The communication between different devices includes a transmission operation (command communication) of information received by the operation unit 20 (a content instructed by a user) to the main body unit 10 and an operation, by the main body unit 10, of notifying the operation unit 20 of an event. Here, the operation unit 20 is able to use the function of the main body unit 10 by performing the command communication with the main body unit 10. The event to be notified by the main body unit 10 to the operation unit 20 includes an execution status of an operation in the main body unit 10, information which is set in the main body unit 10, and the like.

While the main body unit 10 and the operation unit 20 independently operate by separated operating systems in the embodiment, the present invention is not limited thereto and the main body unit 10 and the operation unit 20 may be configured to operate by the same operating system.

While the power is supplied from the main body unit 10 to the operation unit 20 via the communication channel 30 in the embodiment, it is possible to control the power source of the operation unit 20 separately (independently) from the control of the power source of the main body unit 10. For example, when the operation unit 20 is configured to be detachable from the main body unit 10, the operation unit 20 stores the electric power supplied from the main body unit 10 through the communication channel 30 in a secondary battery. The operation unit 20 then uses the electric power stored in the secondary battery when detached from the main body unit 10 to operate and communicate with the main body unit 10.

Next, an example of a hardware configuration of the remote operation terminal 2 will be explained.

Figure 4:
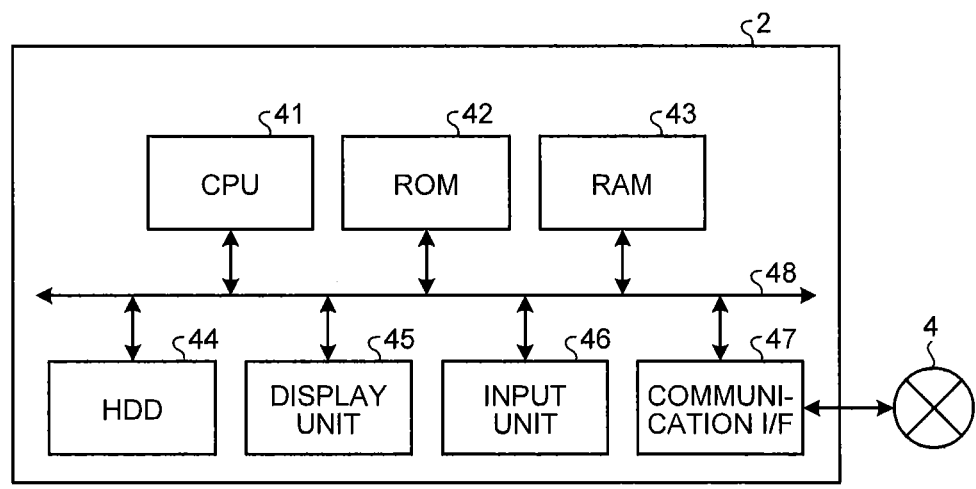
FIG. 4 illustrates an example of a hardware configuration of a remote operation terminal according to the embodiment.

FIG. 4 illustrates an example of a hardware configuration of the remote operation terminal 2 according to the embodiment. As illustrated in FIG. 4, the remote operation terminal 2 is provided with a CPU 41, a ROM 42, a RAM 43, an HDD 44, a display unit 45, an input unit 46, and a communication I/F 47. The remote operation terminal 2 realizes various functions including displaying a screen of the operation panel 27 received from the MFP 1 in the display unit 45 and receiving an input for remotely operating the MFP 1. The CPU 41, the ROM 42, the RAM 43, the HDD 44, the display unit 45, the input unit 46, and the communication I/F 47 are connected to each other via a system bus 48.

The CPU 41 totally controls an operation of the remote operation terminal 2. The CPU 41 uses the RAM 43 as a work area (work space) and executes programs stored in the ROM 42 or the HDD 44. With this configuration, the CPU 41 realizes various functions including the controlling of the entire operation of the remote operation terminal 2, the displaying of the screen of the operation panel 27 received from the MFP 1 in the display unit 45, and the receiving of the input for remotely operating the MFP 1.

The display unit 45 is, for example, a liquid crystal display (LCD) device. It should be noted that the display unit 45 is not limited to the liquid crystal display device. The display unit 45 may be configured by an organic EL display device, for example. The display unit 45 displays a screen of the operation panel 27 received from the MFP 1.

The input unit 46 is an input device such as a keyset and a mouse. The input unit 46 receives an input of operation information for remotely operating the MFP 1.

The communication I/F 47 is an interface that enables a connection to the network 4.

Next, an example of a hardware configuration of the service person terminal 3 will be explained.

Figure 5:
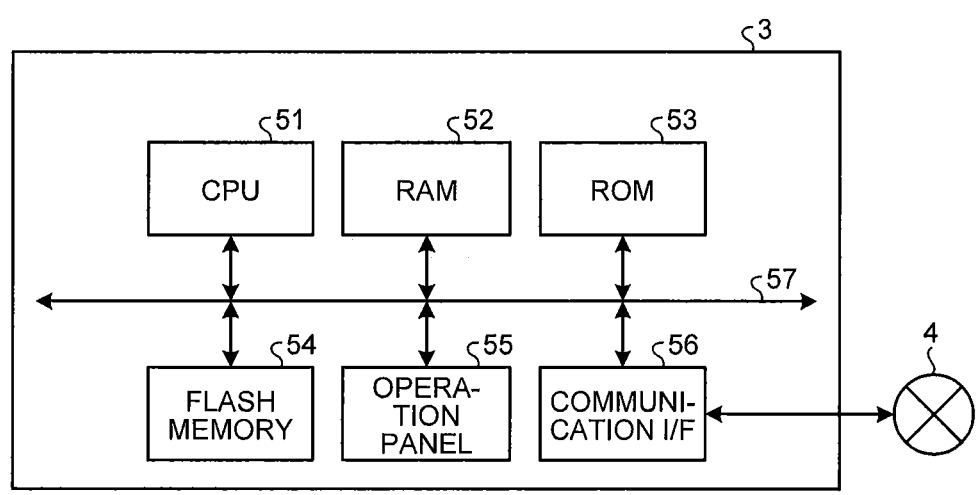
FIG. 5 illustrates an example of a hardware configuration of a service person terminal according to the embodiment.

FIG. 5 illustrates an example of a hardware configuration of the service person terminal 3 according to the embodiment. As illustrated in FIG. 5, the service person terminal 3 is provided with a CPU 51, a RAM 52, a ROM 53, a flash memory 54, an operation panel 55, and a communication I/F 56. The service person terminal 3 realizes various functions including receiving a setting, changed via a remote operation, of the MFP 1 from the MFP 1 and displaying the changed setting of the MFP 1. The CPU 51, the RAM 52, the ROM 53, the flash memory 54, the operation panel 55, and the communication I/F 56 are connected to each other via a system bus 57.

The CPU 51 totally controls an operation of the service person terminal 3. The CPU 51 uses the RAM 52 as a work area (work space) and executes programs stored in the ROM 53 or the flash memory 54. With this configuration, the CPU 51 realizes various functions including the controlling of the entire operation of the service person terminal 3, the receiving of the setting, changed via the remote operation, of the MFP 1 from the MFP 1, and the displaying of the changed setting of the MFP 1.

The operation panel 55 is, for example, a liquid crystal display (LCD) device equipped with a touch-screen function. The operation panel 55 receives inputs of various kinds in accordance with operations by a user and displays information of various kinds. The operation panel 55 also displays the setting, changed via remote operation, of the MFP 1. It should be noted that the operation panel 55 is not limited to the liquid crystal display device. The operation panel 55 may be configured by an organic EL display device equipped with a touch-screen function, for example.

The communication I/F 56 is an interface that enables a connection to the network 4.

Next, an example of a functional block of each device of the image processing system 1000 will be explained.

Figure 6:
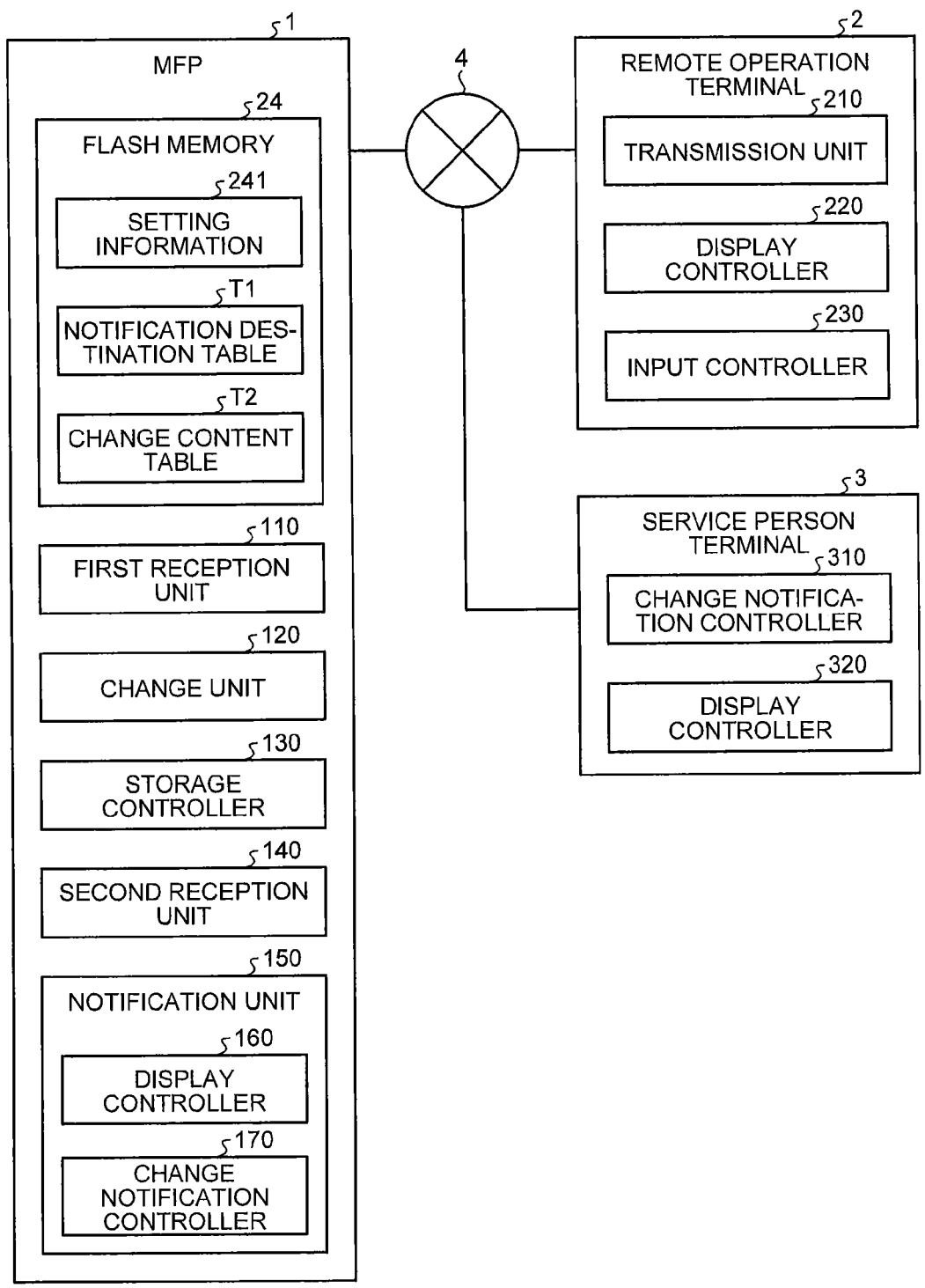
FIG. 6 illustrates an example of functional blocks of the image processing system according to the embodiment.

FIG. 6 illustrates an example of functional blocks of the image processing system 1000 according to the embodiment. While main functions according to the embodiment are exemplified in FIG. 6 for the sake of simplicity in the explanation, the functions of the devices of the image processing system 1000 are not limited thereto.

The CPU (11 or 21) of the MFP 1 executes programs stored in the storage device (the ROM 12, the HDD 14, the ROM 22, the flash memory 24, and the like, for example), so that a first reception unit 110, a change unit 120, a storage controller 130, a second reception unit 140, a notification unit 150, a display controller 160, and a change notification controller 170 are realized.

The CPU 41 of the remote operation terminal 2 executes programs stored in the storage device (the ROM 42, the HDD 44, and the like, for example), so that a transmission unit 210, a display controller 220, and an input controller 230 are realized.

The CPU 51 of the service person terminal 3 executes programs stored in the storage device (the ROM 53, the flash memory 54, and the like, for example), so that a change notification controller 310 and a display controller 320 are realized.

The flash memory 24 as a storage unit stores setting information 241, a notification destination table T1, and a change content table T2. The setting information 241, the notification destination table T1, and the change content table T2 may be stored in a storage medium except for the flash memory 24. For example, the setting information 241, the notification destination table T1, and the change content table T2 may be stored in the HDD 14 of the main body unit 10.

The setting information 241 includes settings of various functions provided in the MFP 1.

FIG. 7 illustrates an example of the notification destination table T1 according to the embodiment. The notification destination table T1 stores notification destination information indicating a notification destination to which a notification to the effect that the setting information 241 is changed when so is to be transmitted. In the notification destination information, a notification destination name, a detail of the notification destination, and a necessity of notification are stored. The notification destination name is a name of the notification destination. The detail of the notification destination is detailed information indicating the notification destination. For example, the detail of the notification destination is, for example, a mail address and the like of the notification destination. The necessity of notification is a setting on a necessity of notification. Specifically, the necessity of notification is information in which whether or not a notification to the notification destination is required is registered. The MFP 1 provides a notification to the notification destination which is registered to require a notification in the necessity of notification. On the other hand, the MFP 1 does not provide the notification to the notification destination which is registered not to require the notification in the necessity of notification. Here, the necessity of notification may be set for each notification destination or set collectively with respect to all the notification destinations. Alternatively, when notification destinations can be divided into groups, the necessity of notification may be set for each of the groups. In the notification destination information in the notification destination table T1 illustrated in FIG. 7, "service person A" for the notification destination name, a mail address "serviceA@abcd.co.jp" for the detail of the notification destination, and "necessary" for the necessity of notification are registered. Besides, in another set of notification destination information, "service person B" for the notification destination name, a mail address "serviceB@abcd.co.jp" for the detail of the notification destination, and "not necessary" for the necessity of notification are registered. While mail addresses are registered for the detail of notification destination illustrated in FIG. 7, the detail of notification destination may be other than mail addresses.

FIG. 8 illustrates an example of the change content table T2 according to the embodiment. The change content table T2 stores, when the setting information 241 is changed, change content information indicating a content concerning the change of the setting information 241. The change content information includes time and date, a person in charge of the change, and a change content. The time and date corresponds to information indicating a time and date when the setting is changed. The person in charge of the change corresponds to information enabling an identification of a person who uses the remote operation terminal 2 to make the change of the setting information 241 via the remote operation. The change content corresponds to information indicating a changed content in the setting. The change content further includes a setting item, a pre-change setting, and a post-change setting. The setting item corresponds to information indicating an item whose setting is changed. The pre-change setting corresponds to information indicating a setting content before the change. The post-change setting corresponds to information indicating a setting content after the change. The change content information in the change content table T2 illustrated in FIG. 8 shows that "support A" for the person in charge of the change changed "volume setting" for the a setting item from "50" to "100" on and at "05/23/2015, 11:56:43" for the time and date. Besides, another set of change content information shows that "support B" for the person in charge of the change changed "print image quality" for the setting item from "high quality" to "standard" on and at "05/25/2015, 12:12:23" for the time and date. In the time and date illustrated in FIG. 8, month, day, and year and hours, minutes, and seconds are recorded. However, all the information above may not be recorded in the time and date. Moreover, a time scale less than seconds may be recorded or another time scale indicating time and date may be used in the time and date of the change.

The first reception unit 110 of the MFP 1 activates a remote operation application and receives a remote operation from the remote operation terminal 2 connected via the network 4. The first reception unit 110 returns an acknowledgement to the effect that the remote operation is available when receiving a request for remote operation from the remote operation terminal 2. The first reception unit 110 returns screen information when receiving a request for transmitting screen information displayed on the operation panel 27 from the remote operation terminal 2. The remote operation terminal 2 thus displays the screen information in the display unit 45 and receives an input of operation information of remotely operating the MFP 1. The first reception unit 110 as a first receiving unit then receives operation information stored in the flash memory 24 of the remote operation terminal 2 via the network 4.

The change unit 120 as a changing unit changes the setting information 241 stored in the flash memory 24 of the MFP 1 based on the operation information received by the first reception unit 110.

The storage controller 130 starts to record an operation content of the change unit 120 when the first reception unit 110 transmits the acknowledgement to the effect that the remote operation is available. The storage controller 130 ends the recording of the operation content when the first reception unit 110 receives a request for ending the remote operation. The storage controller 130 then determines whether or not the setting information 241 is changed when ending the recording of the operation content. When determining that the setting information 241 is changed, the storage controller 130 stores change content information indicating a content of a change of the setting information 241 in the change content table T2.

Here, the storage controller 130 may record information other than the content regarding the change of the setting information 241. For example, the storage controller 130 may store a history of contents which are remotely operated. In this case, the storage controller 130 is capable of storing an occasion where the setting is referred to without any change of the setting by a person who executes the remote operation. It is thus possible for a service person to grasp that the remote operation is performed.

The second reception unit 140 as a second receiving unit receives an input of operating the MFP 1 from an input unit such as the operation panel 27 provided in the MFP 1. More specifically, the second reception unit 140 receives an operation of exerting the functions provided in the MFP 1 and an operation, by a service person, of maintaining the MFP 1, for example. In maintaining the MFP 1 by the service person, the second reception unit 140 receives a display operation of displaying the setting information 241 stored in the flash memory 24 based on the operation input from the operation panel 27. The service person refers to the setting information displayed in the operation panel 27 and maintains the MFP 1 by taking the condition of the MFP 1, a user's demand, and the like into consideration. Here, the second reception unit 140 may receive an operation from the input device other than the operation panel 27.

The notification unit 150 notifies that the change unit 120 changed the setting information 241 stored in the flash memory 24. More specifically, the notification unit 150 controls, for example, the display controller 160 and the change notification controller 170 provided in the notification unit 150 to notify the content regarding the change, made by the change unit 120, of the setting information 241. Specifically, the notification unit 150 as a notifying unit notifies that the setting information 241 is changed by operation information when the second reception unit 140 receives a display operation after the setting information 241 stored in the flash memory 24 is changed by the operation information.

The display controller 160 displays that the setting information 241 is changed in the operation panel 27 when the second reception unit 140 receives an operation after the setting information 241 is changed by the change unit 120. The display controller 160 displays a pop-up indicating that the setting is changed in the setting screen of the MFP 1, for example.

Figure 9:
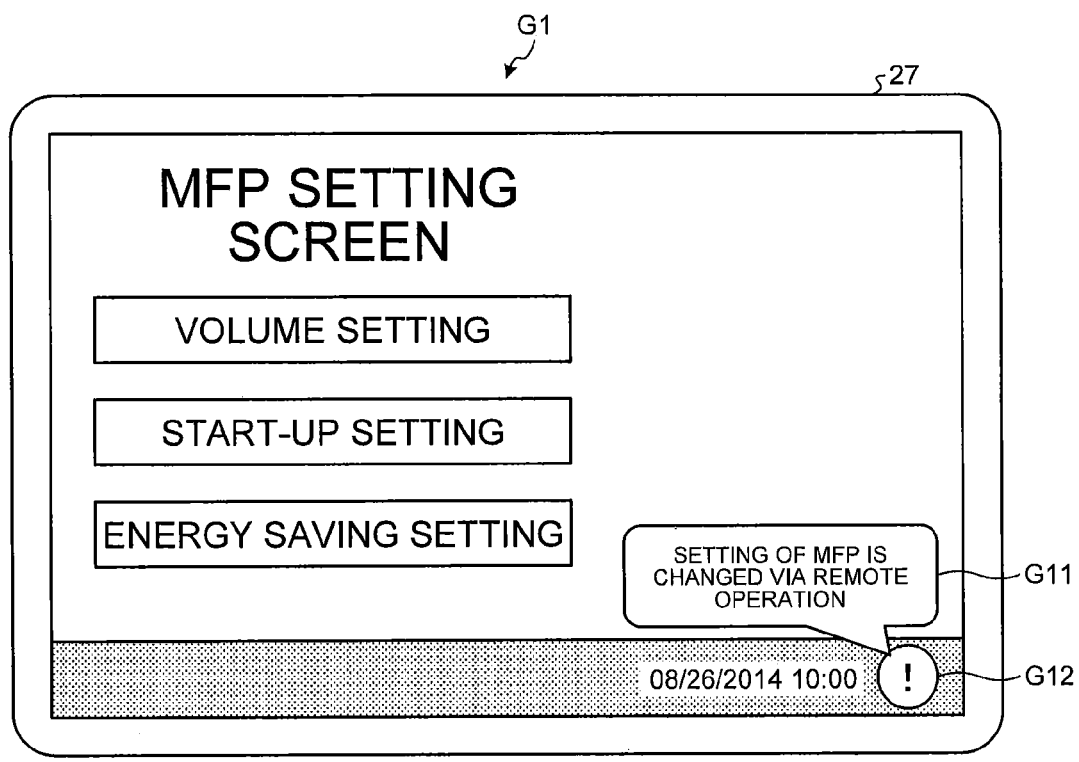
FIG. 9 illustrates an example of an MFP setting screen including a pop-up and an icon displayed in an operation panel according to the embodiment.

Here, FIG. 9 illustrates an example of an MFP setting screen G1 including a pop-up G11 and an icon G12 to be displayed in the operation panel 27 according to the embodiment. The MFP setting screen G1 allows setting various functions provided in the MFP 1. The MFP setting screen G1 illustrated in FIG. 9 includes the pop-up G11 indicating that the setting is changed. The pop-up G11 notifies that the setting is changed by displaying a message "setting of MFP 1 is changed via remote operation". The notification indicating that the setting is changed is not limited to the display of the pop-up G11 and may be provide through a display of a graphic, a mark, and the like. Alternatively, the notification may be provided through sound.

Figure 10:
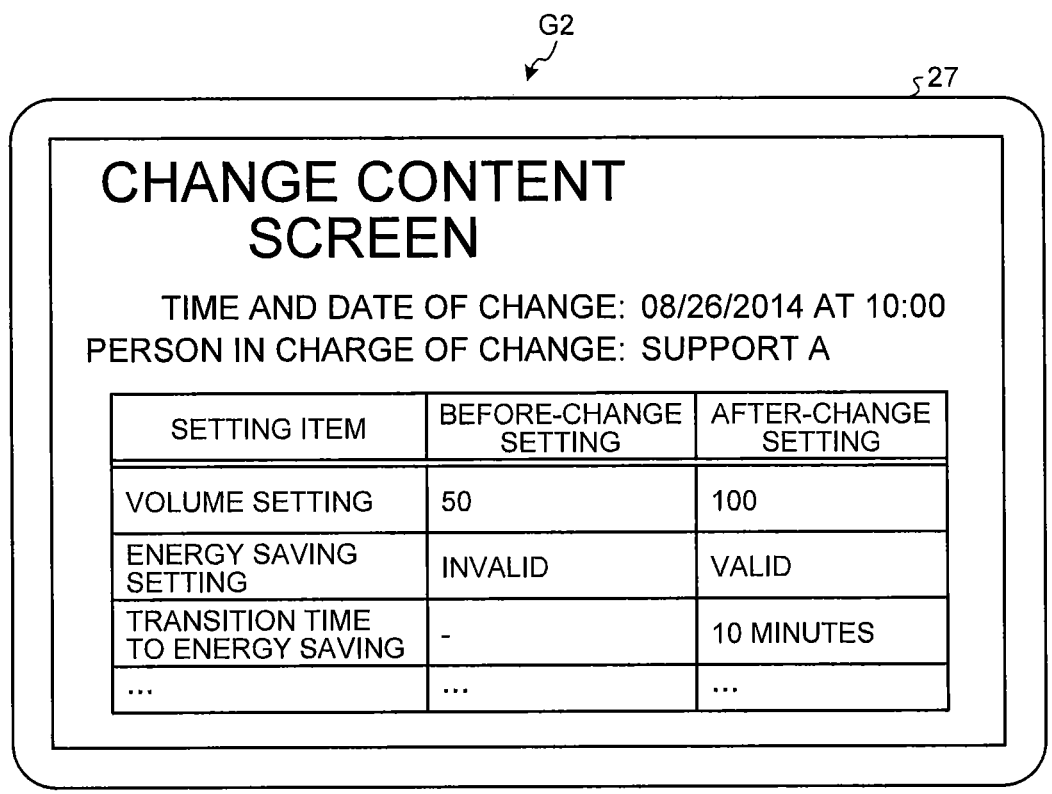
FIG. 10 illustrates an example of a change content screen displayed in the operation panel according to the embodiment.

When an operation of tapping the pop-up G11 on the MFP setting screen G1 is input, the display controller 160 provides a notification by displaying the content regarding the change, by the change unit 120, of the setting information 241 in the operation panel 27 as a display unit. Here, FIG. 10 illustrates an example of a change content screen G2 displayed in the operation panel 27 according to the embodiment. The change content screen G2 is a screen displaying information included in the change content information. In other words, the change content screen G2 is a screen displaying the content regarding of the change of the setting information 241, the change being made based on the operation information that the change notification controller 170 received from the remote operation terminal 2. The display controller 160 then provides a notification by displaying, as the content regarding the change of the setting information 241, "pre-change setting" and "post-change setting" of the setting information 241 changed by the change unit 120 in the change content screen G2. The display controller 160 also provides a notification by displaying, as the content regarding the change of the setting information 241, the time and date when the setting information 241 is changed by the change unit 120 in the change content screen G2. The change content screen G2 may be displayed when an operation of tapping the icon G12 is input.

The change notification controller 170 provides a notification by making the communication I/F 25 as a communication unit transmit the change content information indicating the content regarding the change, made by the change unit 120, of the setting information 241 when the setting information 241 is changed by the operation information. Specifically, when receiving the request for ending the remote operation and ending the recording of the operation content, the change notification controller 170 extracts, from the notification destination information stored in the notification destination table T1, the service person terminal 3 which is registered to require a notification in the necessity of notification. When the notification is registered to be required in the setting of the necessity of communicating with notification, the change notification controller 170 makes the communication I/F 25 transmit the change content information to the service person terminal 3 which is registered to require a notification in the necessity of notification as a notification destination. On the other hand, the change notification controller 170 does not transmit the change content information to the service person terminal 3 which is registered not to require a notification in the necessity of notification. Here, the communication unit is not limited to the communication I/F 25. For example, the communication unit may be the communication I/F 15 provided in the main body unit 10.

The transmission unit 210 of the remote operation terminal 2 remotely operates the MFP 1 connected to the network 4 via the network 4. In remotely operating the MFP 1, the transmission unit 210 transmits the request for remote operation to the MFP 1. When receiving the acknowledgement to the effect that the remote operation is available, the acknowledgement indicating that the remote operation is permitted, the transmission unit 210 transmits the request for transmitting the screen information displayed in the operation panel 27 of the operation unit 20 to the remote operation terminal 2. The transmission unit 210 then receives the screen information from the MFP 1. When an operator of the remote operation inputs operation information by using the input unit 46 with reference to the screen information, the transmission unit 210 as a transmitting unit transmits the operation information that changes the setting information 241 stored in the flash memory 24 of the MFP 1 connected to the network 4 via a remote operation to the MFP 1.

The display controller 220 controls the display unit 45 to display the screen information that the transmission unit 210 received from the MFP 1.

The input controller 230 receives an input of generating the operation information via the input unit 46. When the operator of the MFP 1 inputs a remote operation of the MFP 1 to the input unit 46 with reference to the display unit 45 in which the screen information of the operation panel 27 of the MFP 1 is displayed, the input controller 230 generates the operation information in accordance with the input.

The change notification controller 310 of the service person terminal 3 receives the change content information from the MFP 1 via the network 4.

The display controller 320 controls the operation panel 55 to display the change content information received from the MFP 1. It is thus possible for the service person to grasp the setting changed via the remote operation.

Next, a notification setting processing to be executed by the MFP 1 according to the embodiment in accordance with a program will be explained. The MFP 1 sets a notification destination to which a notification is to be provided when the MFP 1 is operated remotely in the notification setting processing.

Figure 11:
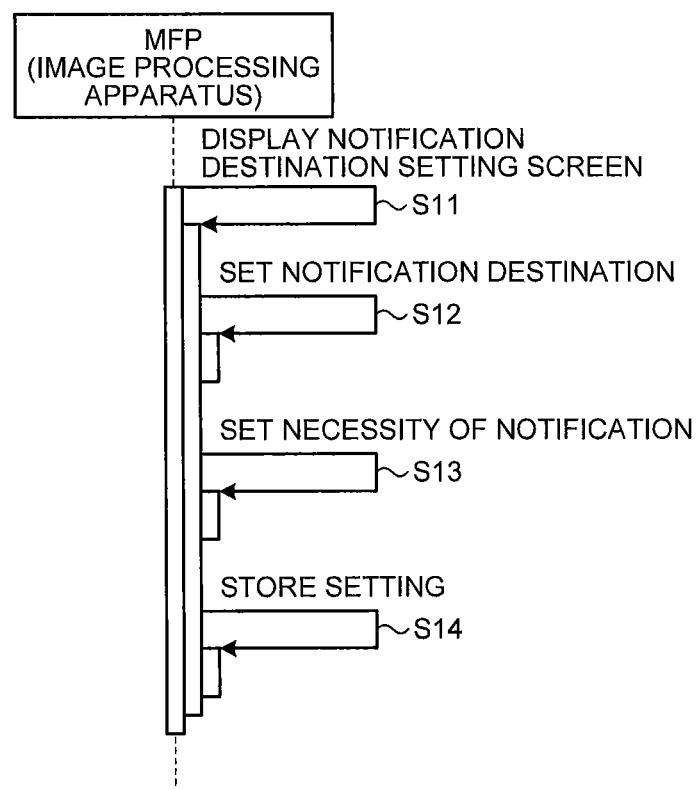
FIG. 11 is a sequence diagram of an example of a notification setting processing to be executed by the MFP according to the embodiment.

FIG. 11 is a sequence diagram of an example of the notification setting processing to be executed by the MFP 1 according to the embodiment.

The MFP 1 first causes a notification destination setting screen (not shown) to be displayed in the operation panel 27 (step S11). The MFP 1 then receives an input of setting a notification destination (step S12).

Next, the MFP 1 receives an input of setting the necessity of notification with respect to the notification destination (step S13). Then, the MFP 1 registers the set notification destination information in the notification destination table T1 (step S14). The MFP 1 executes the notification setting processing in this manner.

A setting processing to be executed by the MFP 1 and the remote operation terminal 2 according to the embodiment in accordance with a program will be explained next. The remote operation terminal 2 changes, via remote operation, the setting information 241 in which the setting of the MFP 1 is stored in the setting processing.

Figure 12:
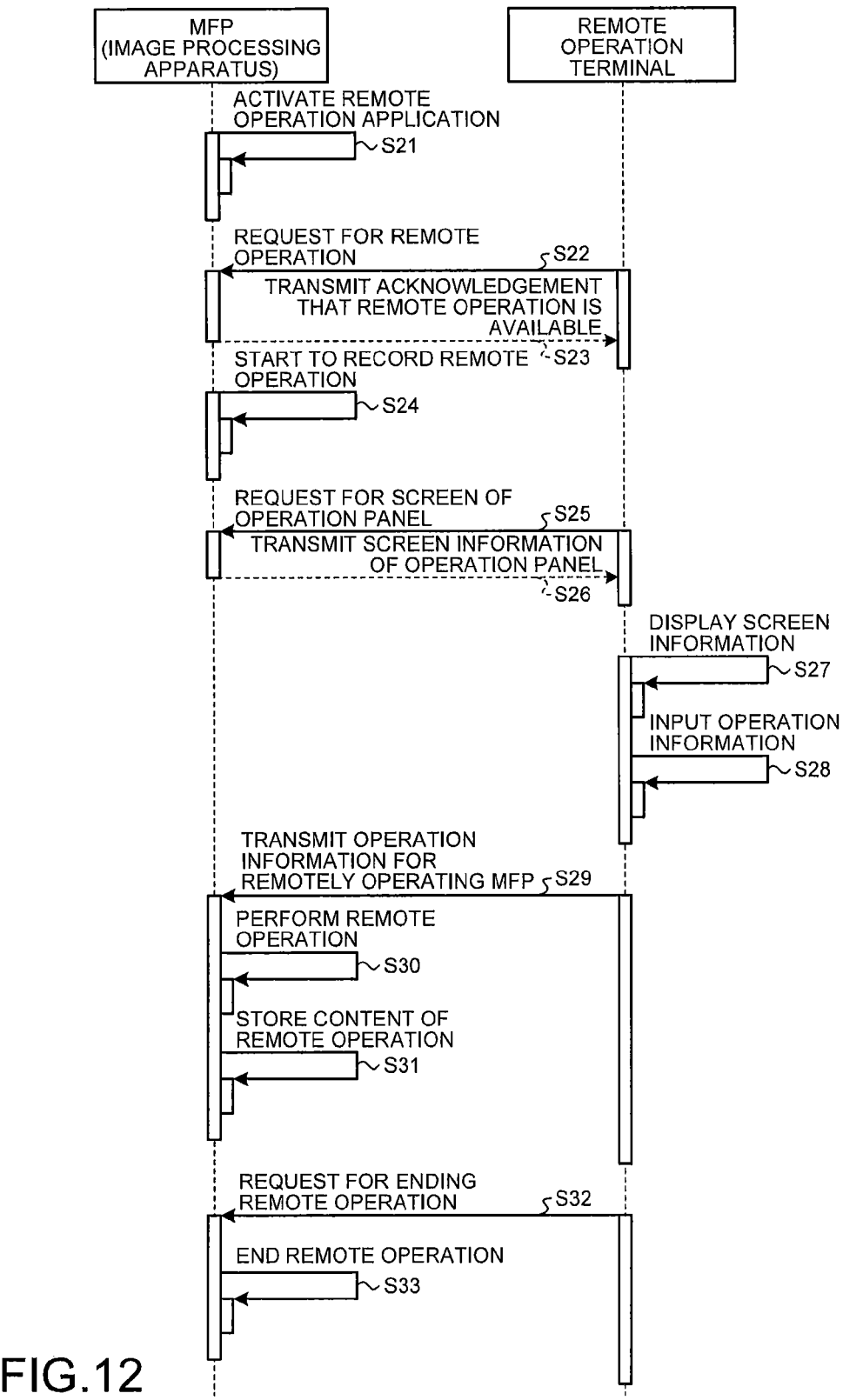
FIG. 12 is a sequence diagram of an example of a setting processing to be executed by the MFP and the remote operation terminal according to the embodiment.

FIG. 12 is a sequence diagram of an example of the setting processing to be executed by the MFP 1 and the remote operation terminal 2 according to the embodiment.

The first reception unit 110 of the MFP 1 first activates the remote operation application (step S21). The transmission unit 210 of the remote operation terminal 2 then transmits the remote operation request to the MFP 1 (step S22).

The first reception unit 110 of the MFP 1 that received the remote operation request transmits the acknowledgement to the effect that the remote operation is available to the remote operation terminal 2 (step S23). The storage controller 130 of the MFP 1 then sets the recording start of the operation content regarding the remote operation (step S24).

The transmission unit 210 of the remote operation terminal 2 then transmits a screen request of requesting for receiving a screen displayed in the operation panel 27 of the operation unit 20 to the MFP 1 (step S25). The first reception unit 110 of the MFP 1 that received the screen request transmits screen information displayed in the operation panel 27 of the operation unit 20 to the remote operation terminal 2 (step S26).

Next, the display controller 220 of the remote operation terminal 2 controls the display unit 45 to display the received screen information (step S27). The input controller 230 of the remote operation terminal 2 then receives operation information input by the operator of the remote operation to the input unit 46 (step S28).

Next, the transmission unit 210 of the remote operation terminal 2 transmits the input operation information to the MFP 1 via the network 4 (step S29). The change unit 120 of the MFP 1 executes the remote operation based on the received operation information (step S30). The storage controller 130 then stores the content regarding the executed remote operation (step S31).

The transmission unit 210 of the remote operation terminal 2 then transmits the request for ending the remote operation to the MFP 1 when the remote operation is ended (step S32). The storage controller 130 of the MFP 1 that received the request for ending the remote operation sets a recording end of the operation content regarding the remote operation (step S33). The MFP 1 and the remote operation terminal 2 execute the setting processing in this manner.

A notifying processing to be executed by the MFP 1 and the service person terminal 3 according to the embodiment in accordance with a program will be explained next. The MFP 1 transmits change content information to the service person terminal 3 when the setting is changed via a remote operation.

Figure 13:
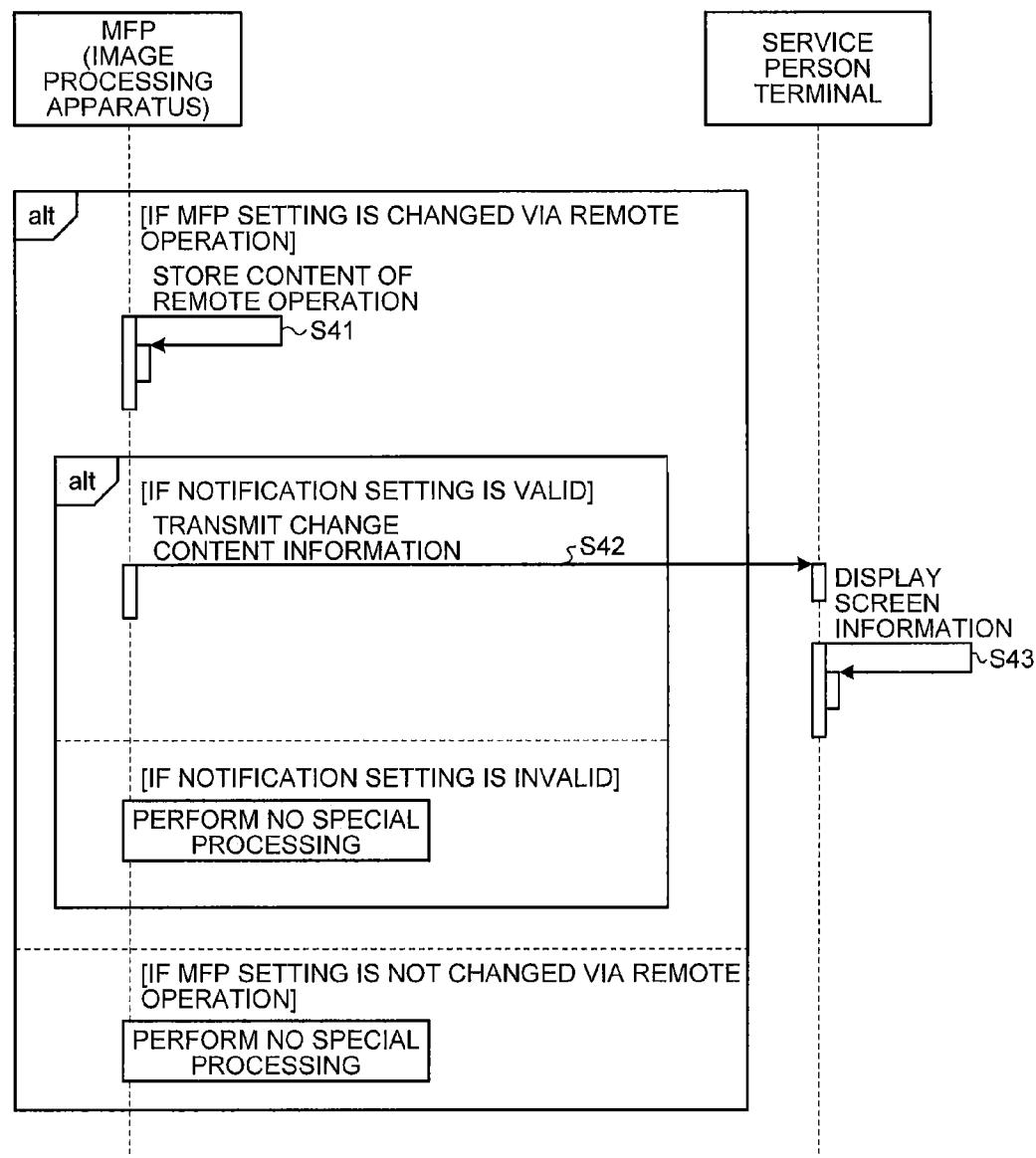
FIG. 13 is a sequence diagram of an example of a notifying processing to be executed by the MFP and the service person terminal according to the embodiment.

FIG. 13 is a sequence diagram of an example of the notifying processing to be executed by the MFP 1 and the service person terminal 3 according to the embodiment. In the sequence diagram, a reference mark "alt" indicates a conditional branching.

First, the storage controller 130 of the MFP 1 determines whether or not the setting information 241 in the flash memory 24 is changed and stores the remote operation content when determining that the setting information is changed (step S41).

Then, the change notification controller 170 of the MFP 1 determines whether or not the notification to the service person terminal 3 is registered to be required in the necessity of notification and transmits the change content information to the notification destination stored in the notification destination information in the notification destination table T1 when the notification is registered to be required (step S42).

The display controller 320 of the service person terminal 3 controls the operation panel 55 to display the change content information when receiving the change content information (step S43).

On the other hand, the MFP 1 does not execute any special processing when the notification to the service person terminal 3 is registered not to be required. Besides, when the setting information 241 is not changed via remote operation, the MFP 1 does not execute any special processing. The MFP 1 and the service person terminal 3 execute the notifying processing in this manner.

Next, a notifying processing to be executed by the MFP 1 according to the embodiment in accordance with a program will be explained. The MFP 1 notifies that the setting information 241 is changed via remote operation in the notifying processing.

Figure 14:
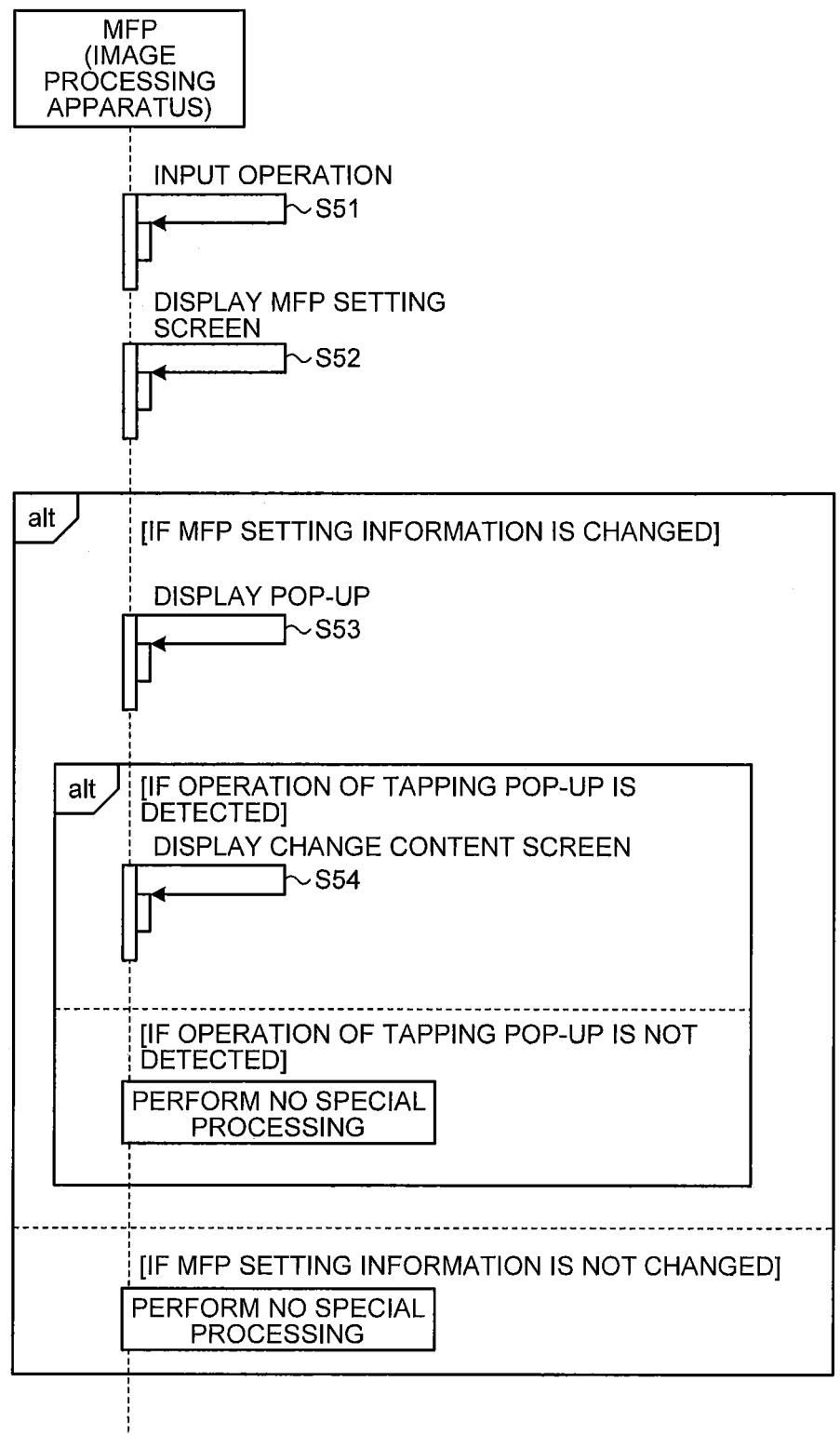
FIG. 14 is a sequence diagram of an example of a notifying processing to be executed by the MFP according to the embodiment.

FIG. 14 is a sequence diagram of an example of the notifying processing to be executed by the MFP 1 according to the embodiment. In the sequence diagram, the reference mark "alt" indicates a conditional branching.

The second reception unit 140 of the MFP 1 first receives an inputting operation by the service person (step S51). The MFP 1 then displays the MFP setting screen G1 in accordance with the input operation (step S52).

When the setting information 241 is changed via the remote operation, the display controller 160 of the MFP 1 then displays the icon G12 including the pop-up G11 in the MFP setting screen G1 (step S53).

The display controller 160 of the MFP 1 displays the change content screen G2 when detecting an input of selecting the pop-up G11 via tapping and the like (step S54).

On the other hand, when not detecting the input of selecting the pop-up G11, the MFP 1 does not execute any special processing. Besides, when the setting information 241 is not changed via remote operation, the MFP 1 does not execute any special processing. The MFP 1 executes the notifying processing in this manner.

As explained so far, according to the image processing system 1000 according to the embodiment, the MFP 1 changes the setting information 241 stored in the flash memory 24 in accordance with operation information when receiving the operation information that causes a remote operation of the MFP 1 from the remote operation terminal 2. The MFP 1 stores change content information indicating change content in the change content table T2. The MFP 1 then provides a notification by displaying the pop-up G11 in displaying the MFP setting screen G1. It is thus possible in the MFP 1 to notify that the setting is changed via remote operation.

While some embodiments according to the present invention are explained, the embodiments are only exemplary instances and not intended to limit the scope of the invention. These new embodiments may be implemented in other various forms and various omissions, replacements, and modifications may be made without departing from the spirit and the scope of the invention. These embodiments and the modifications thereof come within the scope of the invention indicated by the appended claims and the scope of equivalents thereof as well as the scope and the spirit of the invention.

For example, various functions and information provided in the MFP 1 may be provided in the remote operation terminal 2 or the service person terminal 3 and various functions and information provided in the service person terminal 3 may be provided in the remote operation terminal 2. In this manner, various functions and information provided in each device may be provided in any device.

While the functions of the components (the first reception unit 110, the change unit 120, the storage controller 130, the second reception unit 140, the notification unit 150, the display controller 160, and the change notification controller 170) of the MFP 1 are realized when the CPU (11 or 21) executes the program stored in the storage device (the ROM 12, the HDD 14, the ROM 22, and the flash memory 24, for example), the present invention is not limited thereto and at least a part of the functions of the components of the MFP may be realized by a dedicated hardware circuit (semiconductor integrated circuit and the like), for example.

Besides, while the functions of the components (the transmission unit 210, the display controller 220, and the input controller 230) of the remote operation terminal 2 explained so far are realized when the CPU 41 executes the program stored in the storage device (the ROM 42 and the HDD 44, for example), the present invention is not limited thereto and at least a part of the functions of the components of the MFP may be realized by a dedicated hardware circuit (semiconductor integrated circuit and the like), for example.

Besides, while the functions of the components (the change notification controller 310 and the display controller 320) of the service person terminal 3 explained so far are realized when the CPU 51 executes the program stored in the storage device (the ROM 53 and the flash memory 54, for example), the present invention is not limited thereto and at least a part of the functions of the components of the MFP may be realized by a dedicated hardware circuit (semiconductor integrated circuit and the like), for example.

A program to be executed in the image processing system (the MFP 1, the remote operation terminal 2, the service person terminal 3, and the like) according to the embodiment may be provided by being recorded in a file of an installable format or of an executable format in a computer-readable recording medium such as a CD-ROM, a flexible disk (FD), a CD-R, a DVD (Digital Versatile Disk), and a USB (Universal Serial Bus) as a computer program product, and may be provided via a network such as the Internet. Besides, various programs may be provided by being preloaded in a ROM and the like.

According to the embodiment, there is an advantage in that that a setting is changed through a remote operation can be notified.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising:
   an information processing device; and
   an image processing apparatus, the image processing apparatus including,
      a first display,
      first storage storing first computer-executable instructions, and
      one or more first processors configured to execute the first computer-executable instructions such that the one or more first processors are configured to,
         store settings of one or more functions of the image processing apparatus in the image processing apparatus,
         receive operation information indicating at least one change with respect to at least a first setting, the operation information being received at the image processing apparatus via a network, the first setting being one of the stored settings,
         change the stored first setting in accordance with the at least one change indicated by the received operation information,
         display, on the first display, a notification indicating that a setting changing operation has occurred, after changing the stored first setting, and
         display, on the first display, the changed first setting, in response to the displayed notification being selected,
   the information processing device including,
      a second display,
      second storage storing second computer-executable instructions, and
      one or more second processors configured to execute the second computer-executable instructions such that the one or more second processors are configured to,
         receive, from the image processing apparatus, display information of a first screen displayed on the first display of the image processing apparatus,
         display the first screen on the second display of the information processing device,
         receive, as input, first information for remotely operating the image processing apparatus, and
         transmit, as the operation information, the first information to the image processing apparatus, via the network.

2. The image processing system according to claim 1, wherein the one or more first processors are further configured to execute the first computer-executable instructions such that the one or more first processors are configured to,
   transmit, to a remote device, a notification identifying the change made to the stored first setting.

3. The image processing system according to claim 2, wherein the one or more first processors are further configured to execute the first computer-executable instructions such that the one or more first processors are configured to,
   determine that the remote device is registered as a recipient to which transmission of setting change notifications is necessary, and
   transmit the notification identifying the change made to the stored first setting to the remote device, in response to the determination.

4. The image processing system according to claim 1 wherein,
   the one or more first processors are further configured to execute the first computer-executable instructions such that the one or more first processors are further configured to,
      receive, at the image processing apparatus, input indicating the selection of the displayed notification via the first display, and
      show, on the first display, information identifying the change made to the stored first setting, in response to the received input.

5. The image processing system according to claim 4, wherein the one or more first processors are further configured to execute the first computer-executable instructions such that the information identifying the change made to the stored first setting includes,
   a pre-change value that indicates a value of the first setting before the change made to the stored first setting occurred, and
   a post-change value that indicates a value of the first setting after the change made to the stored first setting occurred.

6. The image processing system according to claim 4, wherein the one or more first processors are further configured to execute the first computer-executable instructions .such that the information identifying the change made to the stored first setting includes a time and date when the change made to the stored first setting occurred.

7. An image processing method, comprising:
   storing settings of one or more functions of an image processing apparatus in the image processing apparatus;
   displaying a first screen on a first display, the first display being a display of the image processing apparatus;
   transmitting display information of the first screen to a remote device;
   displaying the first screen on a second display, the second display being a display of the remote device;
   receiving, as input at the remote device, first information for remotely operating the image processing apparatus,
   transmitting, as operation information, the first information from the remote device to the image processing apparatus via a network,
   receiving the operation information at the image processing apparatus from the remote device via the network, the operation information indicating at least one change with respect to at least a first setting, the first setting being one of the stored settings;
   changing the stored first setting in accordance with the at least one change indicated by the received operation information;
   displaying, at the image processing apparatus, a notification indicating that a setting changing operation has occurred, after changing the stored first setting; and displaying, at the image processing apparatus, the changed first setting, in response to the displayed notification being selected.

8. The image processing method according to claim 7, further comprising:

receiving, at the image processing apparatus, input indicating the selection of the displayed notification via the first display, and showing, on the first display, information identifying the change made to the stored first setting, in response to the received input.

* * * * *